(12) United States Patent
Brown

(10) Patent No.: US 7,281,171 B2
(45) Date of Patent: Oct. 9, 2007

(54) SYSTEM AND METHOD OF CHECKING A COMPUTER SYSTEM FOR PROPER OPERATION

(75) Inventor: Andrew Brown, Houston, TX (US)

(73) Assignee: Hewlwtt-Packard Development Company, L.P., Houston, TX (US)

( * ) Notice: Subject to any disclaimer, the term of this patent is extended or adjusted under 35 U.S.C. 154(b) by 744 days.

(21) Appl. No.: 10/341,846

(22) Filed: Jan. 14, 2003

(65) Prior Publication Data

US 2004/0139373 A1    Jul. 15, 2004

(51) Int. Cl.
*G06F 11/00* (2006.01)

(52) U.S. Cl. .......................... 714/48; 710/311

(58) Field of Classification Search ................ 710/311; 714/48, 38

See application file for complete search history.

(56) References Cited

U.S. PATENT DOCUMENTS

| | | | |
|---|---|---|---|
| 5,390,324 A | | 2/1995 | Burckhartt et al. |
| 5,724,528 A | * | 3/1998 | Kulik et al. ................ 710/311 |
| 5,864,656 A | | 1/1999 | Park |
| 6,018,803 A | * | 1/2000 | Kardach ...................... 713/323 |
| 6,101,617 A | | 8/2000 | Burckhartt et al. |
| 6,122,693 A | * | 9/2000 | Gutta et al. ................. 710/107 |
| 6,167,532 A | | 12/2000 | Wisecup |
| 6,246,666 B1 | | 6/2001 | Purcell et al. |
| 6,314,532 B1 | | 11/2001 | Daudelin et al. |
| 6,360,333 B1 | | 3/2002 | Jansen et al. |
| 6,370,656 B1 | | 4/2002 | Olarig et al. |
| 6,412,089 B1 | * | 6/2002 | Lenny et al. ................ 714/769 |
| 6,598,150 B2 | * | 7/2003 | Williams et al. ............ 712/227 |
| 6,915,343 B1 | * | 7/2005 | Brewer et al. .............. 709/224 |
| 6,968,477 B2 | * | 11/2005 | Mehta et al. ................. 714/31 |
| 2002/0184576 A1 | * | 12/2002 | Arndt et al. .................. 714/48 |
| 2003/0028827 A1 | * | 2/2003 | Gray ........................... 714/46 |
| 2003/0172323 A1 | * | 9/2003 | McIntosh et al. ............. 714/43 |

FOREIGN PATENT DOCUMENTS

JP         03292545 A    * 12/1991

OTHER PUBLICATIONS

WIKIPEDIA (Serial bus)—http://en.wikipedia.org/wiki/Serial_bus.*
FOLDOC (Microcontroller)—http:// foldoc.org/?microcontroller.*
Hays et al., "Programming Flash Memory through the Intel386 EX Embedded Microprocessor JTAG Port," Intel AP-720 Application Note, Aug. 8, 1995 (44 p.).

* cited by examiner

*Primary Examiner*—Yolanda L Wilson

(57) ABSTRACT

The specification may disclose a computer system and related method of checking for proper operation of a computer system, and taking corrective action if the computer system is not functioning properly. A monitoring device within the computer system may be programmed to actively monitor computer system operation, and take corrective action upon a failure of one or more computer system components.

6 Claims, 3 Drawing Sheets

SYSTEM AND METHOD OF CHECKING A COMPUTER SYSTEM FOR PROPER OPERATION

BACKGROUND

Computer systems may implement open architectures, which may mean the hardware from many hardware manufacturers, and likewise software from many software manufacturers, may be used on the same computer system. For example, it may be common for a computer system user to install an expansion card, such as a network interface card, produced by a first manufacturer onto a computer system motherboard produced by a different manufacturer, and these two devices may function properly together in most situations. Similarly, computer systems may comprise an operating system, such as Windows® by Microsoft Inc., and also use a variety of end-user programs produced by other manufacturers. While in theory hardware and software from different manufacturers should be operational in an open architecture computer system, in practice a computer system may periodically experience situations where the hardware and/or software ceases functioning properly, locks-up or "crashes," which may be due to conflicts between devices, incursions by software beyond assigned resources, and the like.

Because of the possibility of computer system crashes, some computer manufacturers may implement a passive reset feature known as automatic system reset (ASR). ASR may be a hardware timer implemented within the computer system. If the timer reaches zero, the computer system may be reset (power cycled). In order to avoid the periodic reset of the computer system, a reset software program may periodically execute on the processor of the computer system to reset the timer. Thus, if the computer system is functioning properly, the ASR timer may be periodically reset by the reset software program, thus avoiding a computer system reset. If, however, the hardware or software of the computer system experiences a failure that may keep the reset software program from executing, and presumably operating system and end-user tasks as well, the timer may not be reset and therefore the computer system may reboot.

There may be situations, however, where the reset software program is operational, but other hardware and/or software in the computer have experienced a failure. For example, an expansion bus, such as a PCI bus, may not be functioning properly, and this may in turn keep the computer system from performing its intended task. Operation of the reset software program, however, may not be affected by the PCI bus failure. As a further example, portions of the operating system may not be functioning properly, but again the reset software program may be operational. In these exemplary cases, and others not specifically stated, the ASR may not reset the computer system.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF EMBODIMENTS OF THE INVENTION

The following discussion is directed to various embodiments of the invention. The embodiments disclosed should not be interpreted or otherwise used as limiting the scope of the disclosure, including the claims, unless otherwise specified. In addition, one skilled in the art will understand that the following description has broad application. The discussion of any embodiment is meant only to be exemplary, and not intended to intimate that the scope of the disclosure, including the claims, is limited to these embodiments.

Figure 1:
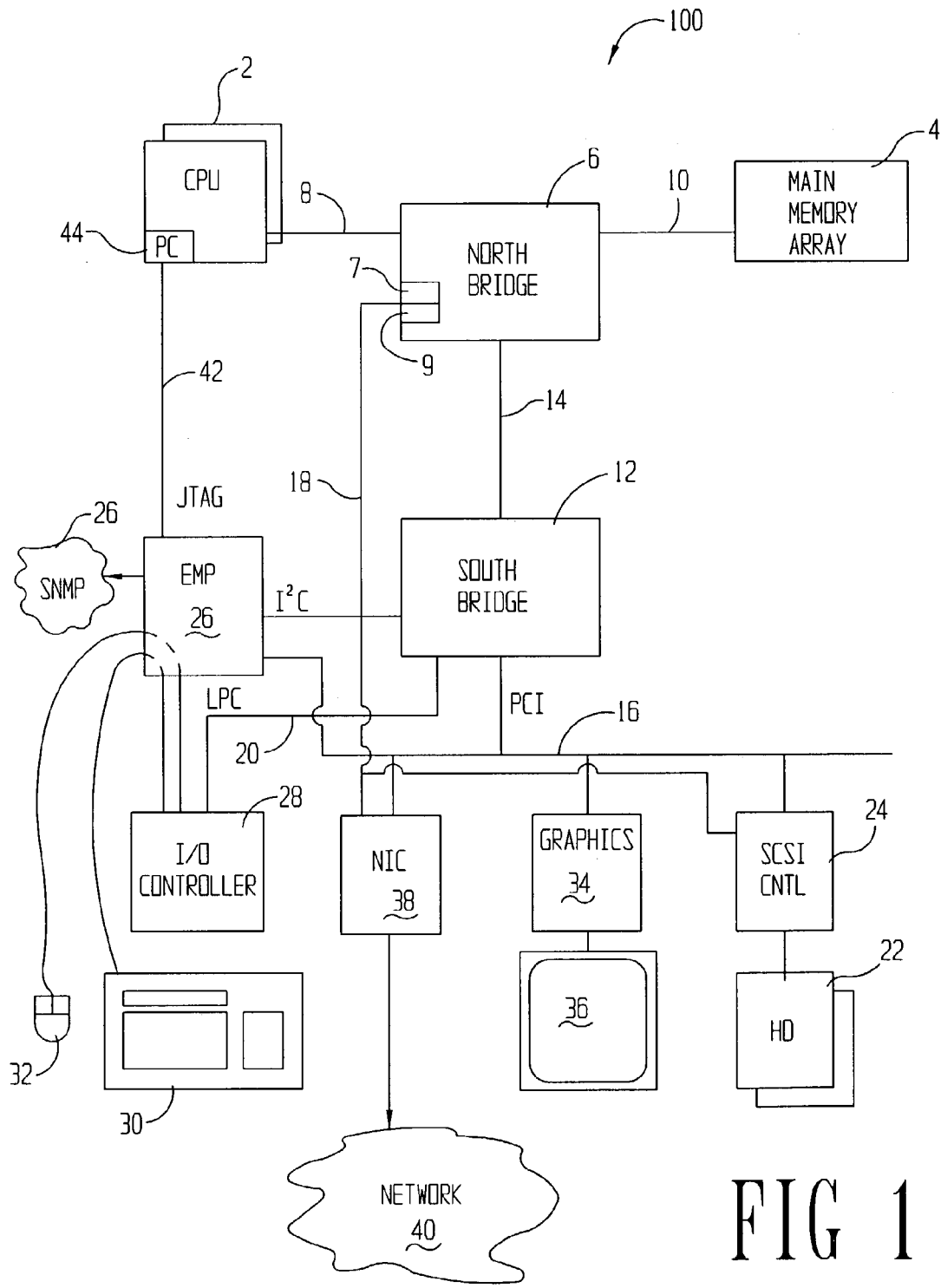
FIG. 1 illustrates a computer system constructed in accordance with embodiments of the invention.

FIG. 1 illustrates a computer system 100 implemented in accordance with embodiments of the invention. In particular, the computer system 100 may comprise a single or multiple central processing units (CPUs or processors) 2 coupled to a main memory array 4. The processors 2 may couple to the main memory array by way of a bridge logic unit 6. In the exemplary computer system 100, the bridge logic unit 6 may be termed "North Bridge" based on its location in computer system drawings. The processors may be Intel® Pentium®4 XEON processors, or Itanium™ processors; however, any suitable processor or array of processors may be used without departing from the scope and spirit of the invention. The processors 2 may couple to the North Bridge 6 by way of a host bus 8.

The main memory array 4 may couple to the North Bridge 6 by way of a memory bus 10. North Bridge 6 may comprise a memory control unit (not shown) that controls transactions to the main memory array 4 by sending the necessary control signals during memory accesses. The main memory array 4 may function as the working memory for the processor 2 and may comprise a conventional memory device or array of memory devices in which programs, instructions and data may be stored. Thus main memory array may comprise any suitable type of memory, such as dynamic random access memory (DRAM) or any other various types of DRAM devices such as synchronous (SDRAM), extended data output DRAM (EDO-DRAM), double-data-rate SDRAM (DDR SDRAM), and the like.

The computer system 100 illustrated in FIG. 1 may also comprise a second bridge logic device 12 that bridges a primary expansion bus 14 to various secondary buses, such as a low pin count (LPC) bus 20, a peripheral component interconnect (PCI) bus 16, and an I²C bus 18. Much like the North Bridge 6, the bridge device 12 may be referred to as a "South Bridge" based on its location in computer system drawings. In at least some embodiments, the North Bridge 6 and South Bridge 12 may be part of a chipset produced by Server Works, Inc., such as the Grand Champion™ HE Chipset. In embodiments such as those illustrated by FIG. 1 utilizing the Grand Champion™ HE chipset, the primary expansion bus 14 may comprise a Thin Intermodule Bus, which is a proprietary bus of Server Works, Inc.; however, the computer system 100 illustrated in FIG. 1 is not limited to any particular type of chipset, and thus the primary expansion bus 14 may comprise other suitable buses such as a PCI bus, or a Hublink bus (which is a proprietary bus of Intel Corporation).

The computer system 100 may further comprise a single hard disk drive (HD) or an array of hard disk drives 22 that may couple to the South Bridge 12 by way of a small computer system interface (SCSI) controller 24 and PCI bus 16. The SCSI controller 24 may control each of the hard disk drives 22 individually, or may operate the hard disk drives 22 as a redundant array of independent devices (RAID) configuration.

The computer system 100 may also comprise an embedded management processor (EMP) device 26, which may also be referred to as a monitoring device. The EMP 26 may couple primarily to the South Bridge 12 by way of the PCI bus 16. The EMP 26, in accordance with embodiments of the invention, may also couple to computer system 100 components in other ways, as discussed below. The EMP 26 may be a microcontroller, which may be a processing unit together with RAM, read only memory (ROM), and input/output capability in an integrated package. In accordance with embodiments of the invention, the EMP 26 may act as a gateway for communication with other computer systems, possibly over a simple network management protocol (SNMP) 26 type network. For example, computer system 100 may couple to other computer systems in a rack of computer systems for control and administrative purposes. Thus, through the SNMP 26 connection a system administrator may provide keystrokes and mouse or pointing device movement data to an input/output (I/O) controller 28, in place of those that may be provided from an attached keyboard 30 and mouse 32. As illustrated in FIG. 1, the keyboard 30 and mouse 32 may thus couple to the I/O controller 28 through the EMP 26, allowing the EMP 26 to provide alternate signals, and to monitor data and control signals from the attached keyboard 30 and mouse 32, as discussed more fully below. The I/O controller 28 may couple to the South Bridge 12 by way of LPC bus 20.

Computer system 100 may also comprise a graphics controller 34 coupled to the South Bridge 12 by way of the PCI bus 16. Alternatively, the graphics controller 34 may couple to the primary expansion bus 14, or other suitable bus, such as an Advanced Graphics Port (AGP) bus (not shown). The graphics controller 34 may further couple to a display device 36. The display device 36 may comprise any suitable electronic display device upon which an image or text can be represented. A suitable display device may comprise, for example, a cathode ray tube (CRT), a liquid crystal display (LCD), a thin film transistor (TFT), a virtual retinal display (VRD), or any other type of device.

Referring still to FIG. 1, the exemplary computer system 100 may further comprise a network interface card (NIC) 38, possibly coupled to the South Bridge 12 and remaining computer system components by way of the PCI bus 16. The NIC 38 may provide protocol translation between the PCI bus 16 and the downstream connection to a network 40, such as the Internet.

In accordance with embodiments of the invention, various aspects of the exemplary computer system 100 may be actively monitored to ensure that the computer system 100 is functioning properly. In particular, the EMP 26 may be responsible for actively checking and monitoring various hardware and software aspects of the computer system 100, while the computer system is in operation. An exemplary list of the systems and devices that may be monitored by the EMP 26 may comprise: verifying that software is properly executing in the one or more processors 2; verifying that main memory array performance is consistent with an operational computer system; monitoring the primary and/or secondary expansion bus utilization; monitoring video operation; monitoring hard drive operation; monitoring activity of the NIC 38; and monitoring for correct activity of an I/O controller coupled to the keyboard and mouse. Before proceeding, it should be understood that this list is merely exemplary, additional or different systems and devices may likewise be monitored as an indication of functionality of the computer system 100.

Referring still to FIG. 1, the EMP 26 may additionally couple the one or more processors 2 by way of a joint test action group (JTAG) communication bus 42. A JTAG bus 42 may be a serial communication bus compliant with the Institute of Electrical and Electronic Engineers (IEEE) standard 1149.1 and IEEE standard 1149.1a. These standards may define an architecture and communication protocol to access signals on a particular device, such as one of the processors 2. In relevant part to this specification, the JTAG communication bus may allow the EMP 26 access to values stored in the various registers of each of the processors 2. The access provided may take place while the computer system is in operation, and may be without assistance of an operating system software. While there may be many registers in a processor that may be monitored to determine operability of the overall computer system 100, embodiments of the present invention may monitor the program counter (PC) register 44 in one or more of the processors 2. The PC register 44 may store an address within the main memory array 4 from which a next program instruction may be read. Thus, in normal operation, the program counter register 44 may change with each instruction, and may over time hold a range values spanning addresses over substantially the entire main memory array.

Figure 2:
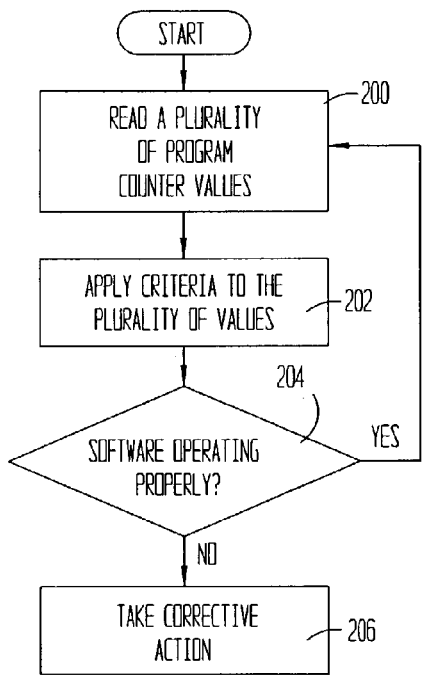
FIG. 2 illustrates a flow diagram in accordance with embodiments of the invention.

Referring to FIG. 2, the EMP 26 may periodically read the values of the PC register 44 in the one or more processors 2 (block 200). It should be understood that in computer systems utilizing multiple processors 2, the EMP 26 may individually track the contents of each of the program counter registers. The EMP 26, using the program counter register information, may apply a criteria (block 202) and thereby determine whether the processors 2 in the computer system are properly executing the software (block 204). For example, in normal operation the program counter, because of branches in the executed code, may range in address values across a significant portion, if not all, of the main memory array 4. If, however, the PC register 44 remains at a single value for an extended period of time (e.g., seconds or more), then the computer system 100, or at least a particular processor, may not be executing software. Alternatively, the PC register 44 may only be cycling through a small subset of the main memory array, whereas previously it may have had broader range, and this too may be indicative of software errors. Thus, based on criteria such as those exemplified above, the EMP 26 may take corrective action to restore the computer system 100 to an operational state (block 206). In the case that a single processor is not functioning properly, it may be possible for the EMP 26 to reset the single processor. In the event that all the processors 2 are experiencing failures, it may be necessary for the EMP 26 to reboot the computer system.

The EMP 26 may additionally couple to the North Bridge over the I²C bus 18 and may monitor main memory array 4 performance by communicating with the North Bridge 6. The I²C bus 18, though illustrated with only a single line in FIG. 1, may be a dual line, multi-drop serial bus developed by Phillips Semiconductor that may comprise a clock line and one data line. Devices connected to the I²C bus may act as either primary or secondary devices, and each device may be software addressable by a unique address. Primary devices may operate as transmitters, receivers, or a combination of transmitter/receiver to initiate eight bit data transfers between the devices on the bus. The I²C bus may utilize collision detection and arbitration to prevent data corruption if two or more primaries simultaneously transfer data. Details regarding the I²C bus may be found in "The I²C Bus Specification," Version 2.1 (January 2000), authored by Phillips Semiconductor. A North Bridge 6 of the Serverworks Grand Champion chipset may be capable of providing memory performance information over the I²C bus interface; however, other chipset manufacturers may now or in the future provide this functionality.

Figure 3:
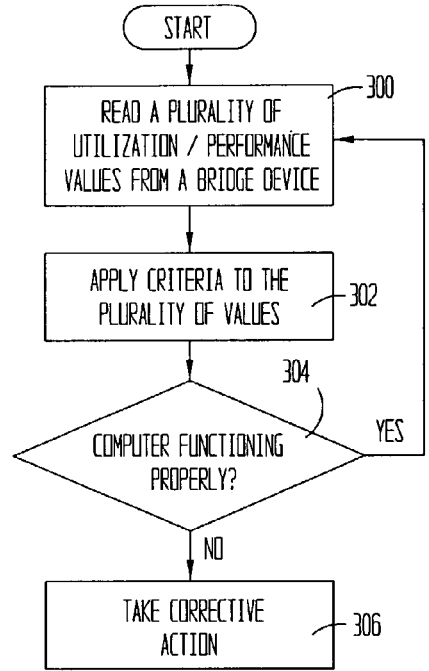
FIG. 3 illustrates a flow diagram in accordance with embodiments of the invention.
Figure 4:
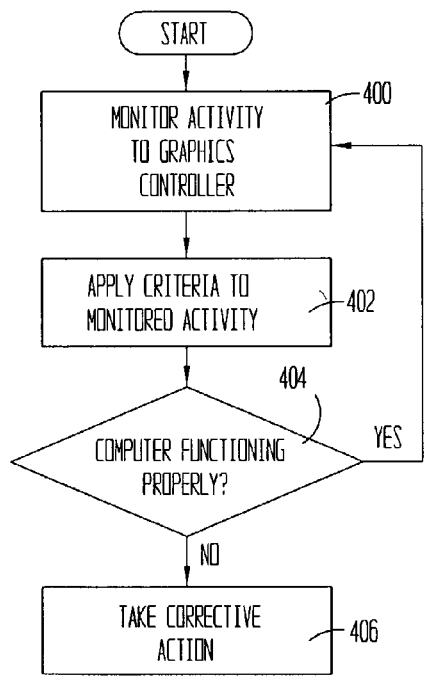
FIG. 4 illustrates a flow diagram in accordance with embodiments of the invention.

FIG. 3 illustrates a flow diagram for monitoring memory performance in accordance with embodiments of the invention. Before proceeding, however, it should be understood that the flow diagram illustrated in FIG. 3 may be equally applicable to a case of reading expansion bus utilization values, as discussed below. Thus, embodiments of the invention may monitor main memory array performance by reading a plurality of values from a register 7 in the North Bridge 6 over the I²C bus 18 (block 300). The register may comprise a value indicative of main memory array performance, which may be periodically updated by the North Bridge 6. The EMP 26, using the plurality of main memory performance values, may apply a criteria (block 302) to determine if the computer system is functioning properly (block 304). If the computer system 100 has low main memory array performance over an extended amount of time, this may be indicative of computer system 100 not functioning properly. The precise criteria, however, may be dependent upon the job performed by the computer system 100. For example, if the computer system 100 is an Internet web server, where most of the web data is cached in the main memory array 4, even a short period of low main memory array performance may indicate that the computer system is not functioning properly. On the other hand, if the computer system 100 is utilized as a file server on a network, an extended period of low main memory array performance may be common, especially during off-peak hours. Thus, based on criteria such as those exemplified above, the EMP 26 may take corrective action to restore the computer system 100 to an operational state (block 306).

In addition to calculating and providing main memory performance information, a Serverworks Grand Champion chipset, in particular the North Bridge 6, may have the capability of calculating and making available secondary expansion bus utilization values. Referring again to the flow diagram of FIG. 3, the EMP 26 may read a plurality of bus utilization values (block 300), possibly by reading a register 9 within North Bridge 6 over the I²C bus 18 or the PCI bus 16. Using the bus utilization information, the EMP 26 may apply criteria (block 302) to determine whether the computer system 100 is functioning properly (block 304). Much like the criteria applied with respect to performance of the main memory array 4, the criteria with respect to bus utilization may be dependent upon tasks assigned the computer system 100. While a very low bus utilization may or may not be indicative of faults in the computer system 100 depending on its application, a bus utilization of zero percent for an extended period of time may be an indication that the computer system 100 is not functioning properly. If the bus utilization drops to zero percent for an extended period of time, the EMP 26 may deduce that the computer system 100 is no longer functioning properly, and take corrective action (block 306). Likewise, a low, but non-zero, bus utilization value for an extended period of time may indicate a computer system not functioning properly in some applications, and thus the EMP 26 may take corrective action (block 306).

Another subsystem of the overall computer system 100 that may be monitored by the EMP 26 is the graphics subsystem. In particular, EMP 26 may couple to the PCI bus 16 and may be configured to monitor traffic on the PCI bus, including traffic directed to the graphics controller 34 (block 400). Based on traffic to the graphics controller, the EMP 26 may apply a criteria (block 402) to determine if the graphics controller 24, and possibly the entire computer system, is functioning properly (block 404). Depending on the specific function performed by the computer system 100, a long period of inactivity regarding the graphics controller 34 may be indicative of a hardware or software failure within the computer system 100. As an alternative means to monitor the graphics activity, and considering that both the EMP 26 and graphics controller 34 may be configured for communication across the PCI bus 16, the EMP 26 may directly inquire with the graphics controller 34 as to its functionality. The graphics driver may either not respond (indicative of a hardware or software failure of the graphics controller 34), or the graphics controller 34 may be able to report problems or lack of activity using messages transferred to the EMP 26 over the PCI bus 16. Regardless of the precise criteria used, the EMP 26 may take corrective action (block 406) if problems are detected, such as by cycling the power to the graphics driver 34, or possibly rebooting the entire computer system 100.

Figure 5:
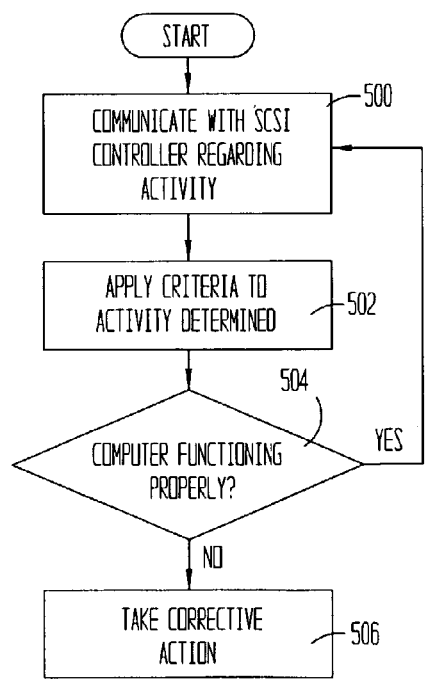
FIG. 5 illustrates a flow diagram in accordance with embodiments of the invention.

Referring again to FIG. 1, computer system 100 may experience failures associated with its SCSI controller 24 or hard drives 22. For example, hardware difficulties, or on-board software difficulties of the SCSI controller 24, may render the computer system 100 inoperable for its intended purpose. Further, failures in the hard drives 22 themselves may render the computer system inoperable. These failures may be of a nature that operating system software and other end-user programs may not be specifically aware of the failure. In embodiments of this invention, the EMP 26 may couple to the SCSI controller 24 over the I²C bus 18. Referring to FIG. 5, the EMP 26 may communicate with the SCSI controller 24, either over the PCI bus 16, or over the I²C bus 18 and may determine recent activity to the hard drive or may determine an amount of time since the last activity to the hard drives 22 (block 500). Based on this information, the EMP 26 may apply a criteria (block 502) to determine whether the computer system 100 has experienced a failure (block 504). The particular function performed by the computer system 100 may affect the criteria applied by the EMP 26. As in the previous example, if the computer system 100 is utilized as a web server that caches the great majority of Internet web pages in the main memory array 4, there may be little activity to the hard drives 22. By contrast, a computer system 100 as illustrated in FIG. 1 utilized as a file server may normally see significant activity to the hard drives 22, and thus, an extended period of inactivity may be indicative of possible failures. If the EMP 26, applying a particular set of criteria, determines that the SCSI controller 24 and/or hard drive 22 have become inoperable, the EMP may take corrective action (block 506), such as cycling the power to these individual devices, or rebooting the entire computer.

Figure 6:
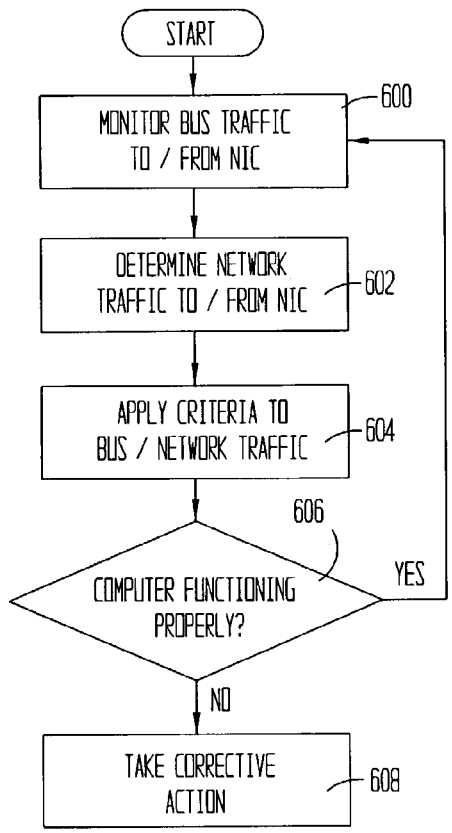
FIG. 6 illustrates a flow diagram in accordance with embodiments of the invention.

EMP 26 may additionally couple to the NIC 38 over the over the I²C bus 18, and may monitor the NIC 38 device for activity. This monitoring may take place over the PCI bus 16, the I²C bus 18, or a combination of both. In normal computer system 100 operation, the NIC 38 may send and receive data to and from the network 40, possibly the Internet. Likewise, data may be transferred to/from the NIC 38 and other computer system 100 devices over the PCI bus 16. Regardless of the activity to/from the NIC 38 within the computer system 100 (across PCI bus 16), devices such as NIC 38 may periodically send and receive "heartbeat" signals to/from the network 40 to ensure network connections are in place. Thus, even if network 40 experiences a complete lack of substantive traffic, NIC 38 may periodically receive the "heartbeat" signals from other network interface cards. Turning to FIG. 6, the EMP 26 may monitor the traffic to and from the NIC device 38, possibly by monitoring activity on PCI bus 16, or by inquiring with the NIC 38 directly over the I²C bus 18 (block 600). The EMP 26 may also monitor the NIC 38 for network traffic, possibly by inquiring with NIC 38 by way of the I²C bus 18 (block 602). Based the bus traffic and the network traffic, the EMP 26 may apply a criteria (block 604) to determine if the computer system is functioning properly (block 606). As in the previous exemplary cases, the function performed by the computer system 100 may affect the criteria applied. Very low activity, or no activity, between the NIC 38 and remaining computer system 100 devices may be indicative of a failure of the computer system 100 in some circumstances. However, if the NIC 38 has not received a "heartbeat" communication for an extended amount of time, the EMP 26 may deduce that the NIC 38 has experienced a hardware failure, or the network connection has been lost. In either case, the EMP 26 may take corrective action (block 608), such as directing the cycling of power to the NIC 38, or possibly rebooting the entire computer.

Figure 7:
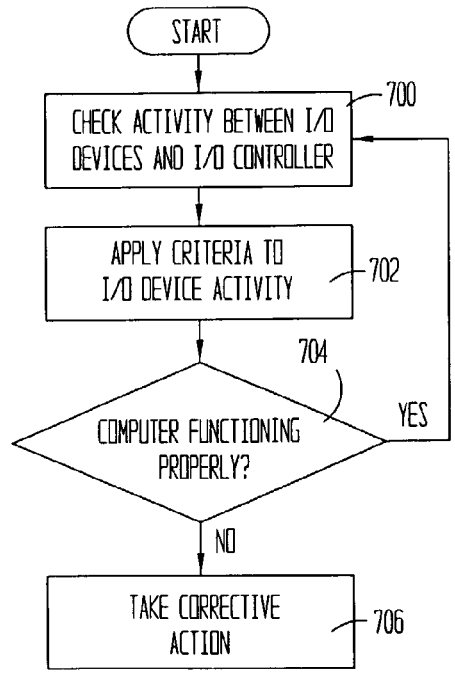
FIG. 7 illustrates a flow diagram in accordance with embodiments of the invention.

Although a computer user may not use a keyboard 30 and mouse 32 for extended periods of time, there may be semi-continuous communications between the I/O controller 28 and the keyboard 30 and mouse 32, similar to the "heartbeat" signals discussed above with respect to the NIC 38. In accordance with embodiments of the invention, the signal lines between the keyboard 30 and mouse 32 couple to the I/O controller 28 by way of the EMP 26. This coupling allows the EMP 26 to direct key strokes and mouse activity originating from the SNMP network 26 to the I/O controller 28, possibly for remote administrative purposes. Because of the routing of the keyboard 30 and mouse 32 signal lines through the EMP 26, the EMP 26 may monitor communications between the I/O controller 28 and these I/O devices. Turning to FIG. 7, the EMP 26 may check and/or monitor activity between the I/O devices (such as keyboard 30 and mouse 32) and the I/O controller (block 700). Based on the activity, the EMP 26 may apply a criteria (block 702) to determine if the computer system is functioning properly (block 704). If the I/O devices cease communications with the I/O controller, or alternatively the I/O controller 28 ceases to respond to activity of the I/O devices, this may be indicative of a hardware or software failure in a computer system 100. Based on criteria specific to a particular computer system 100, the EMP 26 may take corrective action (block 706).

Thus, by actively monitoring one or more of the systems and subsystems described above, the EMP 26 may be capable of determining whether the computer system 100 has experienced some type of failure or "crash." It may be that a failure of any one of the systems monitored may be sufficient for the EMP 26 to take corrective action. Alternatively, the EMP 26 may gather information from two or more of the various monitored software and hardware activities, and take corrective action based thereon. Embodiments of the invention may also use EMP 26 for gathering information regarding the computer system 100, but external devices, possibly in communication with the computer system 100 over the SNMP 26 may apply the criteria and make the determinations as to corrective action.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   operating a computer system;
   checking, by a monitoring device coupled within the computer system, main memory operation by checking a memory performance indicator calculated by a bridge device; and
   taking corrective action by the monitoring device if the computer system is not functioning properly.

2. The method as defined in claim 1 wherein taking correction action further comprises taking corrective action by the monitoring device the main memory performance is low for a predetermined amount of time.

3. A computer system comprising:
   a processor;
   a main memory;
   a first bridge logic coupling the processor to the main memory;
   a management device capable of executing software routines, the management device coupled to the first bridge logic by a first serial communication bus; and
   wherein the management device periodically reads a register in the first bridge logic device across the first serial communication bus, the register holding a value indicative of at least one selected from the group consisting of: expansion bus utilization; and main memory performance;
   wherein the management device is programmed to determine, based on the values read from the register, if the computer system is functioning properly and to take corrective action if the computer system is not functioning properly.

4. The computer system as defined in claim 3 wherein the management device takes corrective action if the expansion bus utilization is low for a predetermined amount of time.

5. The computer system as defined in claim 3 wherein the first serial communication bus is an I²C serial bus.

6. The computer system as defined in claim 3 wherein the management device takes corrective action if the main memory performance is low for a predetermined amount of time.

* * * * *

UNITED STATES PATENT AND TRADEMARK OFFICE
CERTIFICATE OF CORRECTION

| | |
|---|---|
| PATENT NO. | : 7,281,171 B2 |
| APPLICATION NO. | : 10/341846 |
| DATED | : October 9, 2007 |
| INVENTOR(S) | : Andrew Brown |

It is certified that error appears in the above-identified patent and that said Letters Patent is hereby corrected as shown below:

On the title page, in field (73), under "Assignee", in column 1, line 1, delete "Hewlwtt-Packard" and insert -- Hewlett-Packard --, therefor.

In column 8, line 30, in Claim 2, after "device" insert -- if --.

Signed and Sealed this

First Day of July, 2008

JON W. DUDAS
*Director of the United States Patent and Trademark Office*